United States Patent
Lahiri et al.

(10) Patent No.: US 7,613,807 B2
(45) Date of Patent: Nov. 3, 2009

(54) SYSTEM, METHOD, AND APPARATUS FOR DISCOVERING A NEW SERVER CONNECTED WITHIN AN AUTOMATED DATA CENTER

(75) Inventors: Saurav Lahiri, Karnataka (IN); Sandeep Choudri, Karnataka (IN); Dinesh R Bhagwat, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 11/427,366

(22) Filed: Jun. 29, 2006

(65) Prior Publication Data

US 2007/0019626 A1    Jan. 25, 2007

(51) Int. Cl.
G06F 15/173 (2006.01)
(52) U.S. Cl. ...................................... 709/225
(58) Field of Classification Search ................. 709/204, 709/220–228, 201, 209; 370/270, 465, 477, 370/351–358; 310/26–28; 707/100–102
See application file for complete search history.

(56) References Cited

U.S. PATENT DOCUMENTS

| | | | | |
|---|---|---|---|---|
| 6,947,939 B2 * | 9/2005 | Fujibayashi et al. | ........... | 707/10 |
| 7,213,065 B2 * | 5/2007 | Watt | ........................... | 709/223 |
| 7,457,824 B1 * | 11/2008 | Strom et al. | ............. | 707/104.1 |
| 2004/0022237 A1 * | 2/2004 | Elliott et al. | ................. | 370/356 |

* cited by examiner

*Primary Examiner*—Nathan J Flynn
*Assistant Examiner*—Mark O Afolabi

(57) ABSTRACT

A technique for automatically discovering a new server connected within an automated data center. In one example embodiment, this is performed by connecting and powering a new server to one or more data center resources of the automated data center. The new server is then booted-up by loading a temporary OS image from a manager server. Server-specific attributes for the new server are then obtained using the loaded initial temporary OS image by the management server. An SNMP trap is then received from each of the one or more data center resources by the management server upon powering the new server. Each of the received SNMP traps includes physical connection information associated with a connection between the new server and one of the one or more data center resources. An inventory database is then updated by storing the received physical connection information associated with SNMP trap and the obtained server-specific attributes.

18 Claims, 3 Drawing Sheets

SYSTEM, METHOD, AND APPARATUS FOR DISCOVERING A NEW SERVER CONNECTED WITHIN AN AUTOMATED DATA CENTER

TECHNICAL FIELD OF THE INVENTION

The present invention relates generally to automated data centers and more particularly relates to management of new devices within an automated data center.

BACKGROUND OF THE INVENTION

In today's competitive, dynamic, and fluctuating business environment, new on-demand technologies are required to reduce total cost of ownership, improve the return on IT investments, and support company growth. In this regard, system and data utilization rates are relatively low in data centers. These under-utilized IT assets need to be properly tapped to respond to variable workload demands.

Servers are an integral part of any data center and their utilization is generally critical to the efficient operation of the data center. However, in conventional data centers, servers are often underutilized. Further, server-to-administrator ratios are low and there is a requirement for automatic rapid and consistent deployment of the servers. Conventional technologies deployed to automate data centers generally rely on preexisting hardware and are prone to incorrectly discovering new connections arising because of the addition of new servers.

Currently, installation and management of servers in data centers involves a number of complicated tasks. In particular, adding a new server to an automated data center requires determining and loading server-specific attributes and fabric information into the database of the automated data center. Server-specific attribute information includes IP addresses, hostnames, MAC addresses, model numbers, serial numbers, architecture, and the like. Fabric-specific information includes data related to the physical connections between the server and the associated storage and network devices within the automated data center. Conventional techniques for adding a server require manually identifying and loading such information into the database of the data center. Manual identification and entry of server-specific attributes and fabric information can be very time consuming and is prone to data entry errors.

SUMMARY OF THE INVENTION

According to a first aspect of the invention there is provided a method for automatically identifying and loading a new server within an automated data center, the method comprising the steps of:
  a) connecting a new server to one or more data center resources of the automated data center;
  b) booting-up the new server by loading a temporary OS (operating system) image from a management server;
  c) obtaining, by means of the management server, server-specific attributes for the new server using the loaded initial temporary OS image;
  d) receiving, by means of the management server, an SNMP trap from each of the one or more data center resources, wherein each received SNMP trap includes physical connection information associated with a connection between the new server and one of the one or more data center resources; and
  e) updating, by means of the management server, an inventory database associated with the automated data center by storing the received physical connection information and the obtained server-specific attributes associated with each of the one or more data center resources.

Preferably, each SNMP trap includes notification information related to connecting of the new server to an associated data center resource. Preferably, the new server is shutdown upon updating the inventory database with the received physical connection information and the obtained server-specific attributes. Preferably, the new server is subsequently provisioned using the server-specific attributes and the physical connection information stored in the inventory database.

According to a second aspect of the invention, there is provided an article including a storage medium having instructions that, when decoded by a computing platform, result in execution of a method for automatically identifying and loading a new server within an automated data center, the method comprising the steps of:
  a) connecting a new server to one or more data center resources of the automated data center;
  b) booting-up the new server by loading a temporary OS image from a management server;
  c) obtaining, by means of the management server, server-specific attributes for the new server using the loaded initial temporary OS image;
  d) receiving, by means of the management server, an SNMP trap from each of the one or more data center resources, wherein each received SNMP trap includes physical connection information associated with a connection between the new server and one of the one or more data center resources; and
  e) updating, by means of the management server, an inventory database of the automated data center by storing the received physical connection information and the obtained server-specific attributes associated with each of the one or more data center resources.

According to a third aspect of the invention, there is provided a system for automatically identifying and loading a new server within an automated data center, the system comprising:
  a) a processor; and
  b) a memory coupled to the processor, the memory having stored therein code which when decoded by the processor, causes the processor to perform a method comprising:
    1) connecting a new server to one or more data center resources of the automated data center;
    2) booting-up the new server by loading a temporary OS image from a management server;
    3) obtaining, by means of the management server, server-specific attributes for the new server using the loaded initial temporary OS image;
    4) receiving an SNMP trap by the management server from each of the one or more data center resources, wherein each received SNMP trap includes physical connection information associated with a connection between the new server and one of the one or more data center resources; and
    5) updating, by means of the management server, inventory database of the automated data center by storing the received physical connection information and the obtained server-specific attributes associated with each of the one or more data center resources. According to a fourth aspect of the invention, there is provided an automated data center, the automated data center comprising:

a) one or more data center resources;
b) an inventory management database;
c) a new server coupled to the one or more data center resources; and
d) a management server coupled to the inventory management database and the one or more data center resources, wherein the management server comprises:
  1) a bootp server, wherein the new server boots-up by loading a temporary OS image from the bootp server upon connecting and powering the new server to the one or more data center resources and the management server;
  2) a fetch server attribute module that obtains new server-specific attributes using the loaded initial temporary OS image;
  3) an SNMP manager, wherein the SNMP manager receives an SNMP trap from each of the one or more data center resources, wherein each received SNMP trap includes physical connection information associated with the connection between the new server and one of the one or more data center resources; and
  4) an auto update module that updates the inventory management database with the received physical connection information associated with each of the one or more data center resources and the obtained server-specific attributes.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The embodiment described herein automatically discovers the physical connection information. That is, to which port of a terminal server the new server is connected, to which port of a network switch the new server is connected, to which port of fiber channel switch the new server is connected, and other connection/configuration information relating to the newly added server. Further, to reduce errors, the technique automatically loads the new server attributes and the discovered physical connection information into an inventory management database.

The terms "network boot server" and "bootp server" are used interchangeably throughout the document.

Figure 1:
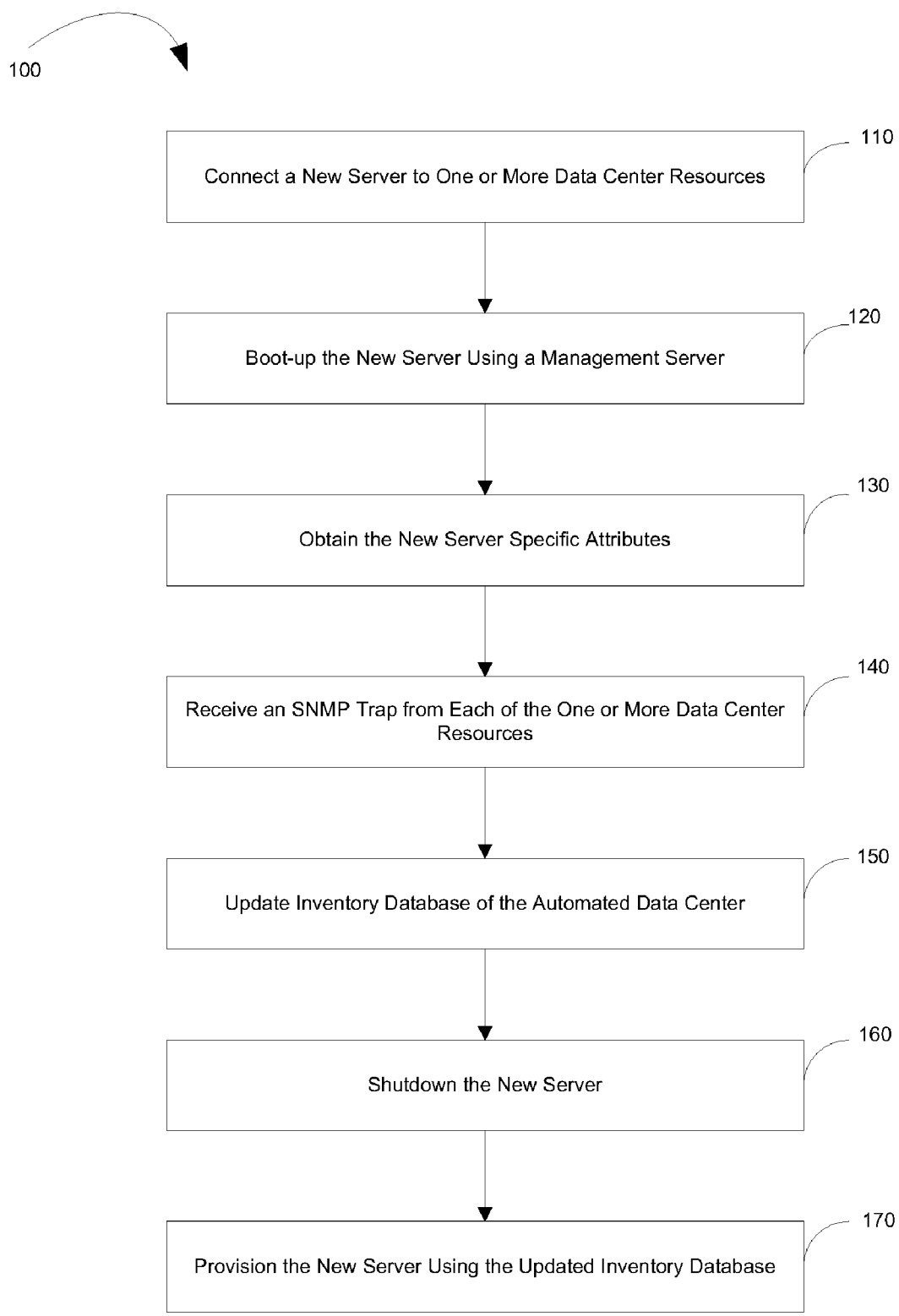
FIG. 1 is a flowchart illustrating an example method of automatically discovering a new server within an automated data center according to an embodiment of the present invention.

FIG. 1 illustrates an example of a method 100 for automatically discovering a new server within an automated data center. At 110, this example method 100 connects the new server to one or more data center resources within an automated data center. The data center resources can include network switches, fiber channel switches, terminal servers, and so on. The new server is then powered-up upon its connection to the one or more data center resources.

At 120, the new server is booted up by loading a temporary OS (operating system) image from a management server. In some embodiments, the new server is booted-up using a network boot routine with the management server acting as the network boot server. In alternative embodiments, the new server is booted-up by creating a SAN (storage area network) disk with a preloaded OS image accessible by the new server using the management server. The OS image in the created SAN disk is then accessed by the new server. The new server is then booted-up with the accessed OS image.

At 130, the server-specific attributes of the new server are then obtained, by means of the management server using the loaded initial temporary OS image. In these embodiments, the server-specific attributes of the new server are obtained upon connecting the new server to the one or more data center resources and powering-up the new server. In alternative embodiments, one or more commands are run to fetch the server-specific attributes from the new server. In other embodiments, a script file having one or more commands is run to fetch the server-specific attributes from the new server. In some embodiments, the management server issues commands to the new server, which has the temporary OS image loaded, in order to obtain the various server-specific attributes. In some embodiments, the commands are issued via telnet and/or SNMP. The server-specific attributes can include MAC addresses, architecture, model numbers, serial numbers, admin user information, admin password, logical IP addresses, WWNs of FC cards, and so on.

At 140, an SNMP trap is received by the management server from each of the one or more data center resources. Each of the received SNMP traps includes physical connection information associated with a connection between the new server and one of the one or more data center resources. The management server obtains the new connection entries related to the new server from the received SNMP traps. In addition, each received SNMP trap includes notification information related to connecting of the new server to an associated data center resource. In these embodiments, each of the one or more data center resources sends an SNMP trap to indicate that one of its inactive ports have become active. For example, the terminal servers and the network switches issue LINKUP traps when they sense that their inactive ports have become active. In these embodiments, each of the one or more devices is configured to send such LINKUP traps.

The physical connection information can include information such as network switch connection data, fiber channel switch connection information, terminal server connection information, and the like. In these embodiments in the context of a single new server, connection information includes the IP address and port number of the resource to which the new server is connected. For example, network switch connection information includes the IP address of the network switch and the port number to which the new server is connected. The fiber channel switch connection information includes the IP address of the fiber channel switch and the port number to which the new server is connected, and so on.

At 150, an inventory database of the automated data center is updated, by means of the management server, by storing the received physical connection information and the obtained server-specific attributes associated with each of the one or more data center resources.

At 160, the new server is shut-down upon updating the inventory database with the received physical connection information and the obtained server-specific attributes. In these embodiments, the new server is available to the automated data center management software for provisioning.

At 170, the new server is then provisioned using the stored server-specific attributes and the physical connection information in the inventory database.

Although the flowchart 100 include steps 110-170 that are arranged serially in the exemplary embodiments, other embodiments of the subject matter may decode two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
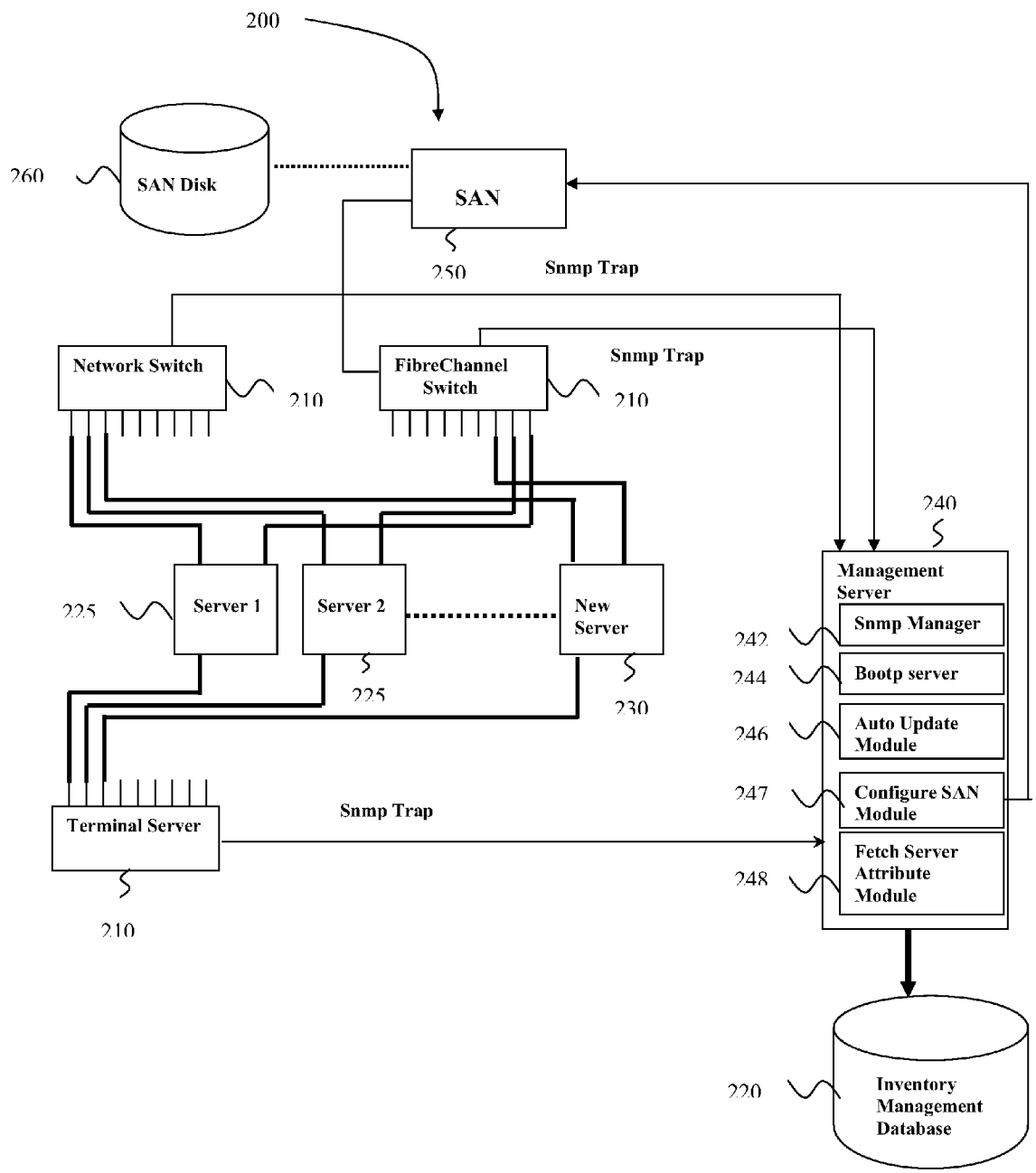
FIG. 2 is a block diagram illustrating an example automated data center configured to implement the method for performing the discovery of a new server within an automated data center of FIG. 1.

Referring now to FIG. 2, there is illustrated a block diagram of an example automated data center 200 for implementing the method for automatically discovering a new server within the automated data center of FIG. 1. The automated data center 200 includes one or more data center resources 210, an inventory management database 220, one or more existing servers 225, a new server 230, a management server 240, a SAN 250, and a SAN disk 260. As shown in FIG. 2, the management server 240 includes an SNMP manager 242, a bootp server 244, an auto update module 246, a configure SAN module 247, and a fetch server attribute module 248.

In operation, the new server 230 boots-up by loading a temporary OS image from the bootp server 244 upon connecting and powering the new server 230 to the one or more data center resources 210 and the management server 240. In these embodiments, the new server 230 boots-up using a network boot routine with the management server 240 as the network boot server. In some embodiments, the configuration SAN module 247 configures the SAN 250 such that the SAN disk 260 with a preloaded OS image is made available to the new server 230. The new server 230 then accesses the OS image on the SAN disk 260 and boots-up with that accessed OS image. In these embodiments, the management server 240 is configured to boot-up the new server 230 either by activating the bootp server 244 or the configuration SAN module 247.

The fetch server attribute module 248 then obtains new server-specific attributes using the loaded initial temporary OS image. The server-specific attributes can include the MAC address, architecture, model number, serial number, admin user information, admin password, logical IP address, WWNs of FC cards and so on. In some embodiments, the bootp server 244 runs a script file having one or more commands to fetch the server-specific attributes from the new server 230.

The SNMP manager 242 then receives an SNMP trap from each of the one or more data center resources 210. Each of the SNMP traps includes physical connection information associated with the connection between the new server 230 and one of the one or more data center resources 210. The physical connection information can include network switch connection information, fiber channel switch connection information, terminal server connection information, and the like. In these embodiments, the connection information includes an IP address and a port number to which the new server 230 is connected. For example, the network switch connection information includes IP address of the network switch and port number to which the new server 230 is connected, the fiber channel switch connection information includes IP address of the fiber channel switch and the port number to which the new server 230 is connected, and so on.

In some embodiments, the software component of the SNMP manager 242 receives the SNMP traps and message alerts sent by the one or more data center resources 210. In some embodiments, the bootp server 244 allows a diskless data center resource to discover its own IP address, the address of a server host, and the name of a file to be loaded into the memory and executed. In these embodiments, the bootstrap operation can be thought of as consisting of two phases. During the first phase address determination and boot file selection occurs. During the second phase the file transfer occurs. The file transfer typically uses the TFTP (trivial file transfer protocol) protocol, since it is intended that both the phases reside in client memory. The bootstrap can also work with other protocols, such as SFTP (secure file transfer protocol), FTP (file transfer protocol) and so on.

The auto update module 246 then updates the inventory management database 220 with the received physical connection information associated with each of the one or more data center resources 210 and the obtained server-specific attributes. The new server 230 is then shut-down upon updating the inventory management database 220 with the received physical information and the obtained server-specific attributes. The new server 230 can then be provisioned using the updated server-specific attributes and the physical connection information in the inventory management database 220. The operation of the automated data center 100 is explained in more detail with reference to FIG. 1.

Various embodiments of the present invention can be implemented in software, which may be run in the environment shown in FIG. 3 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to decode code stored on a computer-readable medium. The embodiments of the present invention may be implemented in part or in whole as machine-executable instructions, such as program modules that are decoded by a computer. Generally, program modules include routines, programs, objects, components, data structures, and the like to perform particular tasks or to implement particular abstract data types. In a distributed computing environment, program modules may be located in local or remote storage devices.

Figure 3:
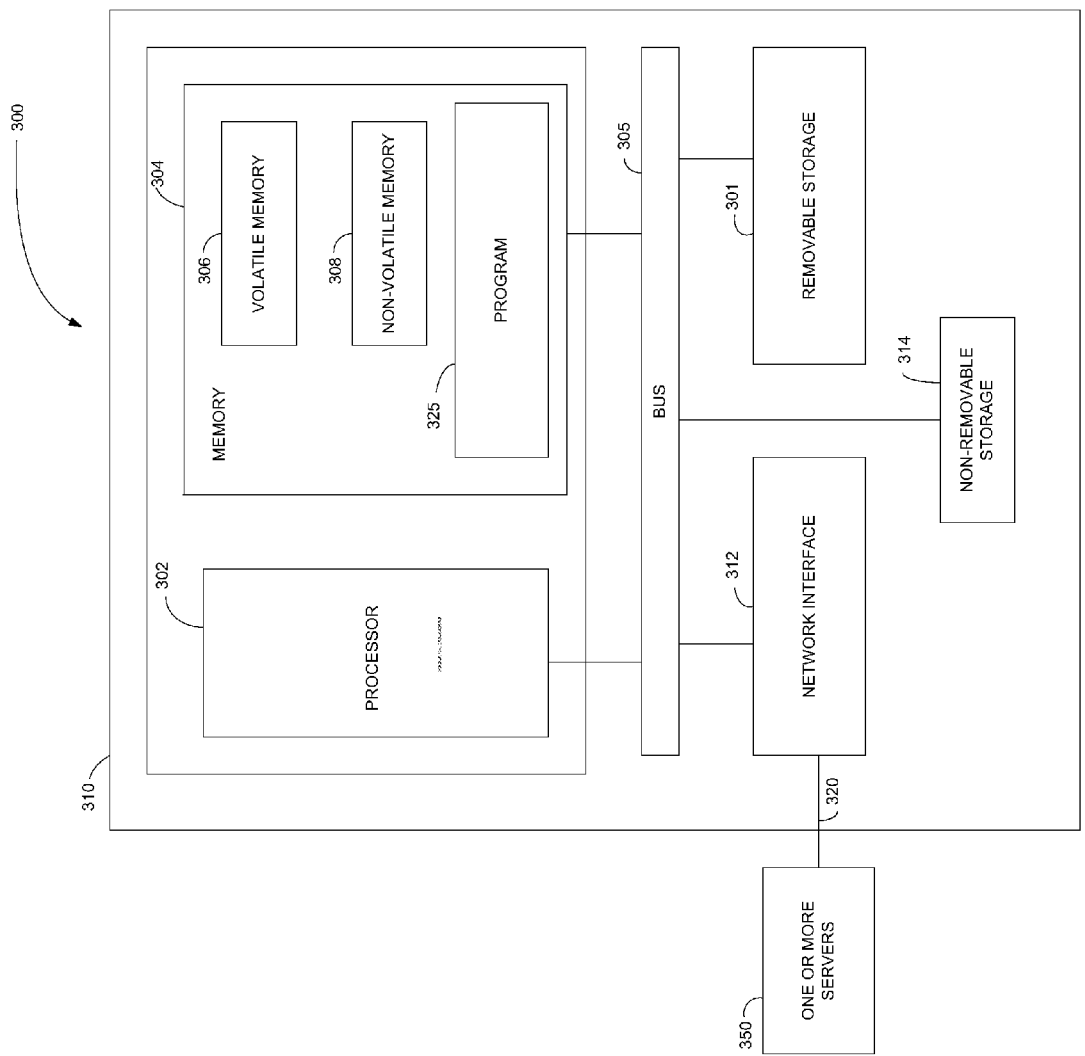
FIG. 3 is a block diagram of a typical computer system used for automatically discovering a new server within an automated data center according to various embodiments of the present invention, such as those shown in FIGS. 1-2.

FIG. 3 shows an example of a suitable computing system environment for implementing embodiments of the present invention. FIG. 3 and the following discussion are intended to provide a brief, general description of a suitable computing environment in which certain embodiments of the inventive concepts contained herein may be implemented.

A general computing device, in the form of a computer 310, may include a processor 302, memory 304, removable storage 301, and non-removable storage 314. The computer 310 additionally includes a bus 305 and a network interface (NI) 312.

The computer 310 may include, or have access to, a computing environment that includes one or more servers 350 and one or more communication connections 320 such as a network interface card or a USB connection. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of the computer 310, such as the volatile memory 306 and the non-volatile memory 308 the removable storage 301 and the non-removable storage 314. The computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drives removable media drive for handling compact disks (CDs), digital video disks (DVDs), diskettes, magnetic tape cartridges, memory cards, Memory Sticks.TM. and the like; chemical storage; biological storage; and other types of data storage.

A "Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, an explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processor 302 of the computer 310. For example, a computer program 325 may comprise machine-readable instructions capable of discovering a new server within an automated data center according to the teachings and herein described embodiments of the present invention. In one embodiment, the computer program 325 may be included on a CD-ROM and loaded from the CD-ROM to a hard drive in the non-volatile memory 308. The machine-readable instructions cause the computer 310 to identify and load a new server within an automated data center according to the various embodiments of the present invention.

The technique according to the embodiments of the present invention described herein is modular and flexible in terms of usage in the form of a "Distributed Configurable Architecture" . As a result, parts of the automated data center of the present invention may be placed at different points of a network depending on the model chosen. For example, the technique can be deployed in a server and the input and output instructions streamed over from a client to the server and back, respectively. The computer program 325 can also be placed on each client, with the database management centralized. Such flexibility allows faster deployment to provide a cost effective solution to changing business needs.

The above description is intended to be illustrative, and not restrictive. Many other embodiments will be apparent to those skilled in the art. The scope of the invention should therefore be determined by the appended claims, along with the full scope of equivalents to which such claims are entitled.

It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1, 2, and 3 are merely representational and are not drawn to scale. Certain proportions thereof may be exaggerated, while others may be minimized. FIGS. 1-3 illustrate various embodiments of the invention that can be understood and appropriately carried out by those of ordinary skill in the art.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of the embodiments of the invention, with each claim standing on its own as a separate preferred embodiment.

The invention claimed is:

1. A method for automatically discovering a new server connected within an automated data center comprising:

connecting a new server to one or more data center resources of the automated data center;

receiving, by means of a management server, an SNMP trap from the one or more data center resources connected to the new server, wherein the SNMP trap includes notification in formation related to connecting of the new server to an associated data center resource;

booting-up the new server by loading a temporary OS image from the management server, wherein booting the new server by loading the temporary OS image comprises:
   creating a SAN (storage area network) disk with a preloaded OS image accessible by the new server using the management server;
   accessing the OS image in the created SAN disk by the new server; and
   booting-up the new server with the accessed OS image;
obtaining, by means of the management server, server-specific attributes for the new server using the loaded temporary OS image, wherein obtaining the server-specific attributes for the new server using the loaded temporary OS image by the management server comprises:
   running a script file having one or more commands to fetch the server-specific attributes from the new server;
receiving after booting-up the new server, by means of the management server, an SNMP trap from each of the one or more data center resources, wherein each received SNMP trap includes physical connection information associated with a connection between the new server and one of the one or more data center resources; and
updating, by means of the management server, an inventory database of the automated data center by storing the received physical connection information and the obtained server-specific attributes associated with each of the one or more data center resources.

2. The method of claim 1, further comprising: shutting down the new server upon updating the inventory database with the received physical connection information and the obtained server-specific attributes.

3. The method of claim 1, further comprising: provisioning the new server using the server-specific attributes and the physical connection information stored in the inventory database.

4. The method of claim 1, wherein booting-up the new server by loading the temporary OS image from the management server comprises:
   booting-up the new server using a network boot routine with the management server as the network boot server.

5. The method of claim 1, wherein the new server-specific attributes are selected from the group comprising MAC address, architecture, model number, serial number, admin user information, admin password, logical IP address, WWNs of FC cards.

6. The method of claim 1, wherein the physical connection information is selected from the group comprising network switch connection information, fiber channel switch connection information, and terminal server connection information.

7. An article comprising:
   a storage medium having instructions that, when decoded by a computing platform, result in execution of a method comprising:
      connecting a new server to one or more data center resources of the automated data center;
      receiving an SNMP trap by a management server from the one or more data center resources connected to the new server, wherein the SNMP trap includes notification information related to connecting of the new server to an associated data center resource;
      booting-up the new server by loading a temporary OS image from the management server, wherein booting the new server by loading the temporary OS image comprises:
         creating a SAN (storage area network) disk with a preloaded OS image accessible by the new server using the management server;
         accessing the OS image in the created SAN disk by the new server; and
         booting-up the new server with the accessed OS image;
      obtaining server-specific attributes for the new server using the loaded temporary OS image by the management server, wherein obtaining the server-specific attributes for the new server using the loaded temporary OS image by the management server comprises:
         running a script file having one or more commands to fetch the server-specific attributes from the new server;
      receiving after booting-up the new server an SNMP trap by the management server from each of the one or more data center resources, and wherein each received SNMP trap includes physical connection information associated with a connection between the new server and one of the one or more data center resources; and
      updating an inventory database of the automated data center by storing the received physical connection information and the obtained server-specific attributes associated with each of the one or more data center resources by the management server.

8. The article of claim 7, further comprising: shutting down the new server upon updating the inventory database with the received physical connection information and the obtained server-specific attributes.

9. The article of claim 7, further comprising: provisioning the new server using the server-specific attributes and the physical connection information stored in the inventory database.

10. The article of claim 7, wherein booting-up the new server by loading the temporary OS image from the management server comprises:
   booting-up the new server using a network boot routine with the management server as the network boot server.

11. A computer system comprising:
   a processor; and
   a memory coupled to the processor, the memory having stored therein code which when decoded by the processor, the code causes the processor to perform a method comprising:
      connecting a new server to one or more data center resources of the automated data center;
      receiving an SNMP trap by a management server from the one or more data center resources connected to the new server, wherein the SNMP trap includes notification information related to connecting of the new server to an associated data center resource;
      booting-up the new server by loading a temporary OS image from the management server, wherein booting the new server by loading the temporary OS image comprises:
         creating a SAN (storage area network) disk with a preloaded OS image accessible by the new server using the management server;
         accessing the OS image in the created SAN disk by the new server; and
         booting-up the new server with the accessed OS image;
      obtaining server-specific attributes for the new server using the loaded temporary OS image by the management server, wherein obtaining the server-specific attributes for the new server using the loaded temporary OS image by the management server comprises:
running a script file having one or more commands to fetch the server-specific attributes from the new server;
receiving after booting-up the new server an SNMP trap by the management server from each of the one or more data center resources, and wherein each received SNMP trap includes physical connection information associated with a connection between the new server and one of the one or more data center resources; and
updating inventory database of the automated data center by storing the received physical connection information and the obtained server-specific attributes associated with each of the one or more data center resources by the management server.

12. The system of claim 11, further comprising: shutting down the new server upon updating the inventory database with the received physical connection information and the obtained server-specific attributes.

13. The system of claim 11, further comprising: provisioning the new server using the server-specific attributes and the physical connection information stored in the inventory database.

14. An automated data center comprising:
one or more data center resources;
an inventory management database;
a SAN;
a SAN disk coupled to the SAN, wherein the SAN disk includes a preloaded OS image;
a new server coupled to the one or more data center resources; and
a management server coupled to the inventory management database and the one or more data center resources, wherein the management server comprises:
a bootp server, wherein the new server boots-up by loading a temporary OS image from the bootp server upon connecting and powering the new server to the one or more data center resources and the management server;
a configure SAN module coupled to the SAN, wherein the configure SAN module configures the SAN such that the SAN disk with the preloaded OS image is made available to the new server, wherein the new server accesses the preloaded OS image in the SAN disk, and wherein the new server boots-up with the accessed OS image;
fetch server attribute module that obtains new server-specific attributes using the loaded temporary OS image, wherein the bootp server runs a script file having one or more commands to fetch the server-specific attributes from the new server;
an SNMP manager, wherein the SNMP manager receives an SNMP trap from each of the one or more data center resources, and wherein each received SNMP trap includes physical connection information associated with the connection between the new server and one of the one or more data center resources, and wherein at least one of SNMP trap received by the SNMP manager includes notification information related to connecting of the new server to an associated data center resource; and
an auto update module that updates the inventory management database with the received physical connection information associated with each of the one or more data center resources and the obtained server-specific attributes.

15. The automated data center of claim 14, wherein the new server is shut-down upon updating the inventory database with the received physical connection information and the obtained server-specific attributes, and wherein the new server is provisioned using the updated server-specific attributes and the physical connection information in the inventory database.

16. The automated data center of claim 14, wherein the new server boots-up using a network boot routine with the management server as the network boot server.

17. The automated data center of claim 14, wherein the new server-specific attributes are selected from the group comprising MAC address, architecture, model number, serial number, admin user information, admin password, logical IP address, WWNs of FC cards.

18. The automated data center of claim 14, wherein the physical connection information is selected from the group comprising network switch connection information, fiber channel switch connection information, and terminal server connection information.

* * * * *